No. 743,553. Patented November 10, 1903.

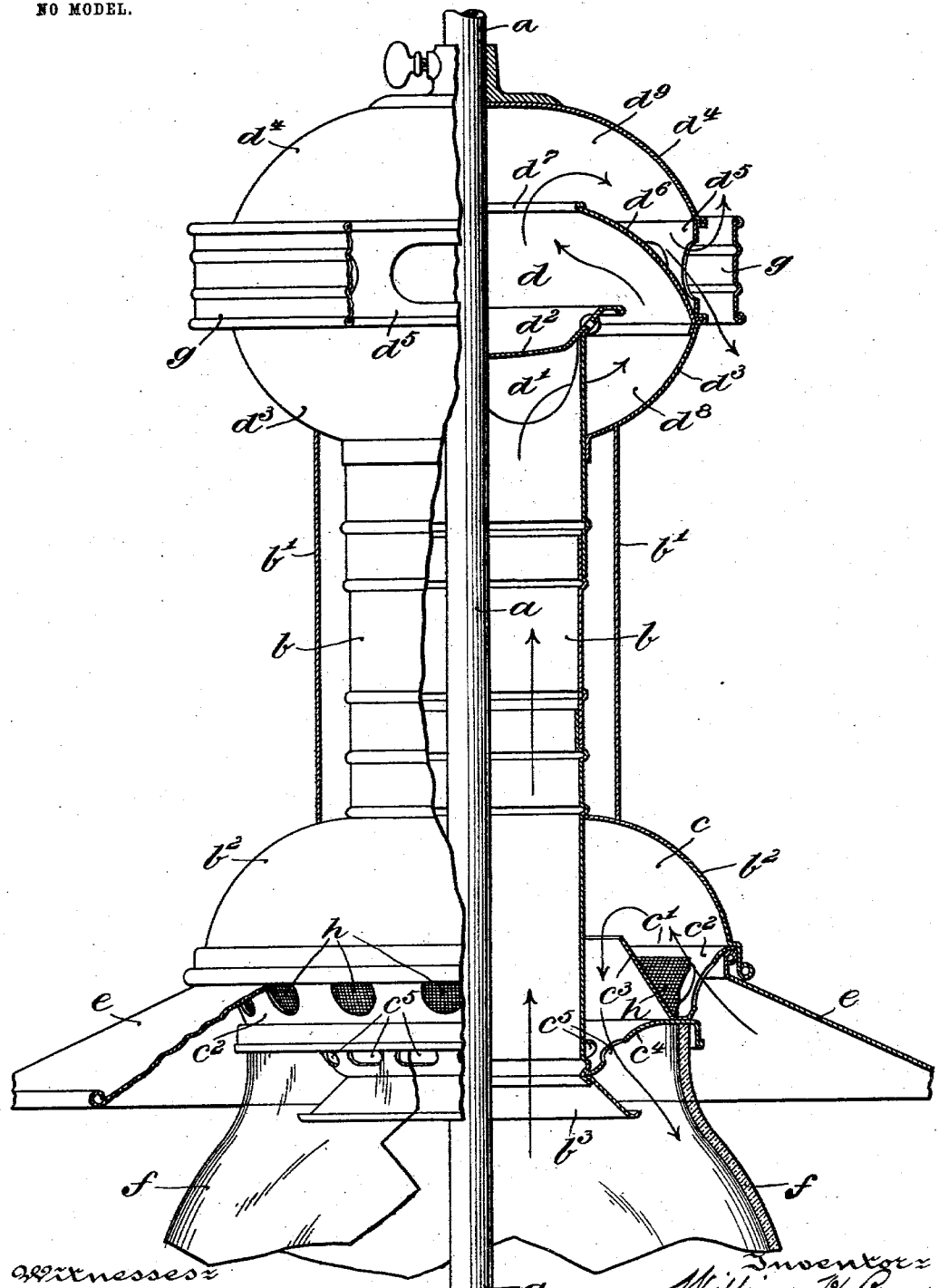

UNITED STATES PATENT OFFICE.

WILLIAM H. PAYNE, OF CAMDEN, NEW JERSEY.

INCANDESCENT GAS-LAMP.

SPECIFICATION forming part of Letters Patent No. 743,553, dated November 10, 1903.

Application filed June 25, 1903. Serial No. 162,995. (No model.)

*To all whom it may concern:*

Be it known that I, WILLIAM H. PAYNE, a citizen of the United States, residing at Camden, in the county of Camden and State of New Jersey, have invented certain new and useful Improvements in Incandescent Gas-Lamps, of which the following is a specification.

My invention has relation to incandescent gas-lamps of the type adapted for employment in open-air situations in which a number of incandescent gas-burners are grouped together to form a battery thereof and in such proximity as to resemble the conventional arc-lamps.

The principal objects of my invention are, first, to provide a wind-proof lamp of the well-known incandescent gas-burner type having the burners arranged within the globe of the lamp in battery or group form, such a lamp being designed especially for outdoor lighting or illumination; second, to provide a lamp of the character described whereof the construction of the lamp is such as that control of air-supply to the lamp to effect complete combustion and also control of the exit of air from the lamp against the presence of incoming air as a back pressure to interfere with steady or uniform illumination is uniformly derived from the lamp, and, third, to provide a lamp of the character described in which the illumination derived from the lamp is uniform under normal or abnormal conditions and in which the lamp is not interfered with as to its illumination by either normal or abnormal exterior air-current conditions about the lamp in the field in which the lamp is displayed and a lamp in which back pressure of air-currents to the lamp is guarded against, thus insuring a wind-proof lamp for outside incandescent gas-burner lighting in which the illumination is steady or uniform from the lamp under normal or abnormal conditions.

My invention, stated in general terms, consists of an incandescent gas-burner lamp constructed and arranged in substantially the manner hereinafter described and claimed.

The nature and scope of my invention will be more fully understood from the following description, taken in connection with the accompanying drawing, forming part hereof, showing partly in elevation and partly in broken section so much of a lamp of the character defined as serves to illustrate the application of my invention to such a lamp, so as to render such in use wind-proof and so as to be unaffected by external normal or abnormal air-currents present about the lamp in use.

Referring to the drawing, $a$ is the main gas-supply pipe; $b$, the main heated-air and waste-gas-product flue suitably incased. This flue terminates at the upper end within a hot-air expansion and discharge chamber $d$ and at the bottom in a cold-air expansion and deflector chamber $c$.

$e$ is the flaring reflector-plate of the lamp, and $f$ the globe, in any suitable manner detachably connected with the lamp and within which globe is intended to be mounted a series of incandescent or mantled gas-burners arranged in a group or battery, but not shown, because such manner of arranging incandescent gas-burners within a closed globe is well understood.

It is essential to the deriving of proper illumination from such type of incandescent or mantled-burner lamps that complete combustion of the gas and air should be had and that the supply of oxygen to the gas to insure a high standard of illumination from the mantles should be always uniform in volume, but without violent agitation, in its presentation in volume continuously to the lighted mantles, so as to prevent flickering or wavering effects being given off in the illumination from the lighted mantled burners. The casing $b'$ surrounding the main heated waste-gas products and heated-air flue $b$ has connected therewith preferably a dome or bell shaped device $b^2$, to which is attached the flaring reflector-plate $e$, this dome or bell shaped device forming the cold-air expansion-chamber $c$ above the globe $f$ and also serves as one means of support for the air-deflector device $c'$ of the chamber $c$. This device consists of reversely-arranged or inverted-V-shaped plates $c^2$ and $c^3$, whereof one is perforated, and the perforations thereof are screened, as at $h$, and the other is imperforate. The imperforate plate $c^3$ serves to baffle the air entering through the perforated plate $c^2$ to cause the same to take a circuitous course prior to its entrance into the interior of the globe $f$ through the perforations $c^5$ of preferably a downwardly-inclined positioned plate $c^4$, which plate forms part of the cold-air-deflector device $c'$. This plate $c^4$ is in engagement at one end with the downward extension $b^3$ of the flue $b$ below the dome or bell shaped air-expansion chamber $c$ and at the other end forms the means with which the upper end of the globe $f$ is in engagement, whereby the course of the external air to the globe $f$ to expand mildly in volume and without violent circulation within the body of the globe is in the direction as indicated by the arrows in the drawing, so as to insure a uniform supply of oxygen to the lighted mantled burners of the group of the lamp and as well a steady illumination being derived from the ignited or lighted mantled burners of the lamp. The entrance of air directed by the deflector device $c'$ to the globe $f$ will be along the inner surface mainly of the globe, and by reason of the mild form in which it will expand in volume within the globe the character of illumination will be very superior, as well as uniform, due to the complete combustion and admixture of the air with the gas issuing from the grouped-together mantled burners within the globe.

In order to insure steady or uniform illumination without destruction or charring of the mantles in such type of outside lamps as described and avoidance of back pressure of external cold air coming in contact with the escaping waste-gas products of combustion and heated air, the lamp must have provision at the top to guard practically against such back pressure by suction of the waste products of ignition or combustion of the mantled grouped-together burners from the lamp under normal and abnormal influences arising constantly in such types of outside lamps, which must of necessity be subject constantly to varying atmospheric conditions. The arrows in the upper portions of the drawing disclose the passage in volume and circuitous travel of the waste products and unspent heated air from the lamp incident to the use of the same, as well as the manner in which entrance of cold air at the upper portion of the lamp is prevented or guarded against, which would interfere with the steady or uniform working of the lamp, causing flickering or wavering illumination, as well as charring or breaking of the mantles of the burners in their heated condition.

The waste product and heated expansion and air-discharge chamber $d$ is connected with the main flue $b$. The wall of this flue projects into the chamber $d$, and in the wall are provided openings $d'$ at suitable distances apart. The upper end of this flue $b$ is closed by a disk or dish-shaped plate $d^2$, which serves to baffle or deflect outside air to prevent its entering the flue $b$ from the chamber $d$. The chamber $d$ is preferably made spherical shape in sections at $d^3$ and $d^4$, these sections being separated from each other in their connected position by a partially-perforated band or ring $d^5$. Opposite the perforated band or ring $d^5$ is a circular ring $g$, arranged so as to provide a space between the body of the chamber $d$ and this ring $g$ to guard against the free entrance of outside air into the chamber $d$, while at the same time is adapted to control the exit of the expanded products and heated air within the chamber $d$ before discharging into the atmosphere without the lamp. Within the chamber $d$, in rear of the ring or band $g$, is arranged a preferably spherical-shape baffle or guard plate $d^6$, secured to the lower section of the chamber $d$ and at its upper end provided with a wide opening $d^7$ in order that the spent waste products and heated air from the flue $b$ may be afforded a circuitous course, as indicated by the arrows, from the flue $b$, through the expansion-chamber $d^8$, around the wall of the plate $d^6$ into the discharge portion $d^9$ of the chamber $d$, and then through the perforations of the ring or band $d^5$, and by means of the guard $g$ deflected either upward or downward, or in both directions, as indicated by the arrows. It will be understood that the volume of the waste products and heated air in their expanded condition in the chamber $d$ will always be sufficient in specific gravity to retard or even prevent possible access of outside air to the chamber $d$ to interfere with the steady or uniform illumination of the mantled burners of the lamp or flickering or charring of the mantles thereof, and this is mainly due to the disposition of the disk or dish-shaped plate $d^2$ in the upper end of the flue $b$ and to the baffle-plate $d^6$ within the chamber $c$ adjacent to the perforated ring $d^5$ of the shell and the guard-plate $g$, disposed opposite to said perforations in the wall of said chamber $d$. The suction of air into the lamp to be heated and mixed with the gas of the burners and the discharge of the spent gas and heated air as waste products from this lamp uniformly, as practice has demonstrated, insure in the use of such lamp a reliable wind-proof lamp for outside situations, whether the surrounding and other conditions are normal or abnormal.

Having thus described the nature and objects of my invention, what I claim as new, and desire to secure by Letters Patent, is—

1. In a lamp of the character described, a globe inclosing the burners of said lamp, in combination with a flue extending above the globe and burners to receive and lead off the products of combustion, said flue having lateral openings near its outlet end, a closure for the outlet end of said flue above the lateral openings thereof, a casing forming an inclosed discharge-chamber surrounding the outlet end of said flue, and means provided within the casing for conducting the products of combustion by sinuous passage-ways from the lateral openings of the flue to the external atmosphere.

2. In a lamp of the character described, a globe inclosing the burners of the lamp, in combination with a flue extending above the globe and burners to receive and lead off the products of combustion, said flue having lateral openings near its outlet end, a closure for the outlet end of said flue above the lateral openings in said flue, a casing forming an inclosed discharge-chamber surrounding the outlet end of said flue, said casing having outlets arranged centrally in its periphery, means provided within the casing for conducting the products of combustion by sinuous passage-ways from the lateral openings of the flue to the external atmosphere through the outlets of said casing and a guard-ring arranged outside the casing adjacent to and guarding the discharge-outlets of said casing.

3. In a lamp of the character described, a flue or offtake arranged above the burners of the lamp, and a globe inclosing the burners and the lower end of said flue, in combination with a casing forming an air-inlet chamber surrounding the flue and the upper or open end of said globe, and means located within said casing for conducting air from the external atmosphere by sinuous passage-ways into the open end of said globe.

In testimony whereof I have hereunto set my signature in the presence of two subscribing witnesses.

WILLIAM H. PAYNE.

Witnesses:
J. WALTER DOUGLASS,
THOMAS M. SMITH.